United States Patent [19]

Miyawaki

[11] Patent Number: 5,012,910

[45] Date of Patent: May 7, 1991

[54] TRANSMISSION RATIO CONTROL SYSTEM FOR A CONTINUOUSLY VARIABLE TRANSMISSION

[75] Inventor: Motohisa Miyawaki, Kawasaki, Japan

[73] Assignee: Fuji Jukogyo Kabushiki Kaisha, Tokyo, Japan

[21] Appl. No.: 448,058

[22] Filed: Dec. 8, 1989

[30] Foreign Application Priority Data

Dec. 14, 1988 [JP] Japan .................. 63-317274

[51] Int. Cl.⁵ .............................. B60K 41/26
[52] U.S. Cl. ..................... 192/4 A; 364/424.1
[58] Field of Search ............ 192/4 A, 9; 364/424.1, 364/426.02

[56] References Cited

U.S. PATENT DOCUMENTS

| | | | |
|---|---|---|---|
| 4,039,061 | 8/1977 | Pruvot et al. ................... | 192/4 A |
| 4,674,363 | 6/1987 | Miyawaki .................... | 364/424.1 X |
| 4,829,433 | 5/1989 | Nakano et al. ................. | 364/424.1 |
| 4,913,270 | 4/1990 | Ishido et al. .................. | 192/4 A |

FOREIGN PATENT DOCUMENTS 61-290269 12/1986 Japan .

Primary Examiner—Richard Lorence
Attorney, Agent, or Firm—Martin A. Farber

[57] ABSTRACT

A continuously variable transmission for a motor vehicle has a drive pulley, a driven pulley, and a belt engaged with both the pulleys. A hydraulic circuit has a pump for supplying oil to hydraulic cylinders of both pulleys, and a transmission ratio control valve has a spool slidably mounted in a valve body for controlling the oil supplied to the cylinder of the drive pulley to change the transmission ratio. The locking of the wheels of the vehicle at braking of the vehicle is detected, and releasing of the locked wheels is detected. The transmission ratio is held at the detected locking of the wheels. And the held transmission ratio is released when releasing of the locked wheels is detected.

8 Claims, 7 Drawing Sheets

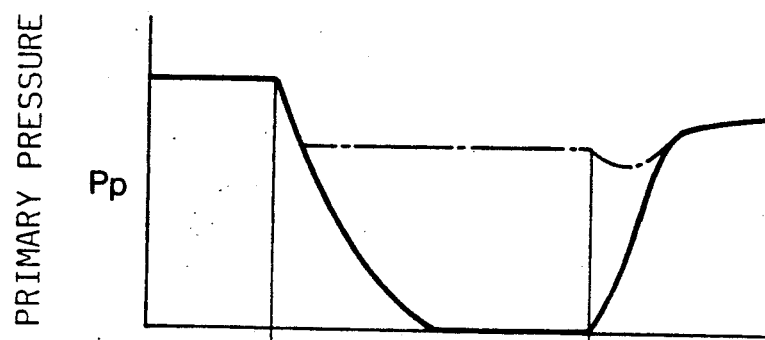
FIG. 5a
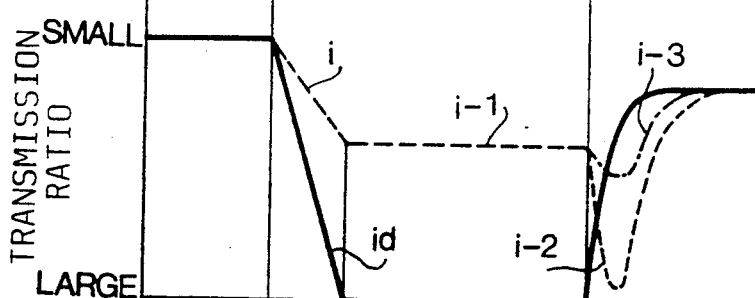
FIG. 5b
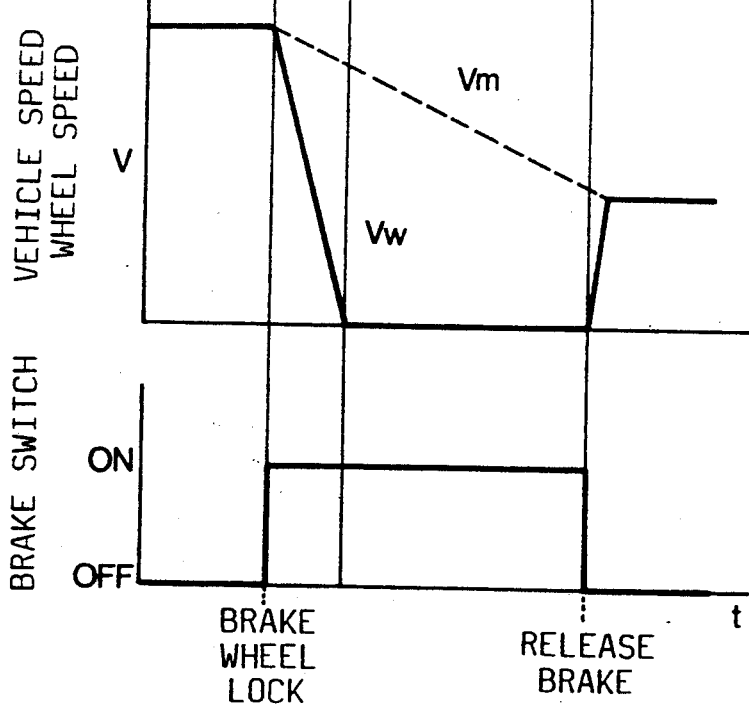
FIG. 5c
FIG. 5d

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for preventing the belt from slipping on the pulleys of the belt drive transmission and for preventing shock at the recovery of belt gripping.

A control system is known for a continuously variable belt-drive transmission comprising an endless belt running over a drive pulley and a driven pulley. Each pulley comprises a movable conical disc which is axially moved by a fluid operated servo device so as to vary the running diameter of the belt on the pulleys in dependency on driving conditions. The control system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

At the start of the vehicle, the transmission ratio is set at a maximum value. When the engine speed exceeds a predetermined value, an electromagnetic clutch engages, so that the vehicle is started. When the vehicle speed and engine speed exceed set values under a driving condition, the transmission ratio starts to change (to upshift). The transmission ratio is automatically and continuously reduced, even if the engine speed is kept constant. Thus, the vehicle speed increases with a reduction of the transmission ratio.

In a system for electronically controlling the transmission ratio, a throttle position and driven pulley speed or vehicle speed are detected by sensors to obtain a desired transmission ratio id. The difference id-i between the desired transmission ratio id and the actual transmission ratio i is calculated in order to determine the quantity of oil to be supplied to a cylinder of the servo device of the drive pulley for changing the transmission ratio to the desired transmission ratio. Thus, a primary pressure which is applied to a hydraulic cylinder of the drive pulley is controlled so that the actual transmission ratio i coincides with the desired transmission ratio id.

When the brake pedal is depressed, the speed of the wheels of the vehicle is reduced as well as the body of the vehicle because the wheels grip the road. The primary pressure also decreases with a reduction of the wheel speed so that the running diameter of the belt on the driven pulley is increased to downshift the transmission in dependency on a predetermined change speed pattern.

However, the wheels may be locked when the brake pedal is quickly depressed on a road having a low friction coefficient such as a snowy or icy road. Such a phenomenon is explained with reference to FIGS. 5a to 5d.

When the wheels are locked, the wheel speed Vw rapidly decreases, while the vehicle speed Vm does not quickly decrease because of the slipping of the wheels on the road (FIG. 5c). As a result of a reduction of the speed of the driven pulley, the desired transmission ratio id is increased to downshift the transmission, thereby rapidly decreasing the primary pressure Pp to zero as shown by a solid line in FIG. 5a. Since a vehicle speed sensor is provided which detects the speed of an output shaft of the transmission, the vehicle speed sensor produces a signal which means the vehicle speed largely decreases. As a result, the electromagnetic clutch is disengaged.

Since the wheels are quickly locked, the belt and pulley device are stopped before the transmission ratio reaches a maximum value. Consequently, the belt is held by the gripping operation of the pulleys at a position where the pulleys stop, providing a small transmission ratio i-1 as shown by a dotted line in FIG. 5b.

When the driver notices the wheel lock and releases the brake pedal, the wheels are unlocked so that the wheel speed is quickly increased to coincide proportionally with the vehicle speed Vm. Therefore, the driven pulley is driven by the wheels to rotate the drive pulley through the belt. When the pulleys and belt start to rotate, the gripping force reduces, so that the belt and pulley device are quickly shifted to the large transmission ratio position so as that the actual transmission ratio converges to the desired transmission ratio as shown by a dotted line i-2 in FIG. 5b. Since the inertial mass of a driven member of the electromagnetic clutch, the drive pulley and other members provided between the clutch and the drive pulley is large, a large primary pressure is necessary to grip the belt so as to rotate the drive pulley, the driven member and other members. However, since the primary pressure Pp is still low, the belt slips on the drive pulley.

Since the primary pressure Pp rapidly increases as shown by the solid line in FIG. 5a, the drive pulley suddenly grips the belt, thereby causing a transmitting power change shock. The slipping of the belt and the shock cause deterioration of the belt and hence poor driveability of the vehicle.

Japanese Patent Application Laid-Open 61-290269 discloses a system for controlling the transmission. In the system, a planetary gear device is provided at an output of a continuously variable transmission for controlling the connection of the power train, and for providing a reverse power train. At the sudden braking, the planetary gear device is operated to disconnect the continuously variable transmission from the wheels of the vehicle and to hold the transmission ratio maximum.

However, the disconnection system can only be applied to a planetary gear device provided at the output of the continuously variable transmission and hence it can not be applied to a planetary gear device provided at an input thereof. Moreover, when the brake pedal is released after sudden braking, the continuously variable transmission is connected to the wheels by the planetary gear device. At that time, a great engine braking is effected on the vehicle because the transmission ratio is held at maximum, thereby impairing smooth driving and exerting shock on the belt of the transmission.

SUMMARY OF THE INVENTION

The object of the present invention is to provide a transmission ratio control system wherein the slipping of the belt on the drive pulley of the continuously variable transmission or transmission shock may be prevented.

According to the present invention, there is provided a control system for a continuously variable transmission for transmitting the power of an automotive engine to driving wheels of a vehicle, the transmission comprising a drive pulley having a hydraulically shiftable disc and a hydraulic cylinder for operating the disc, a driven pulley having a hydraulically shiftable disc and a hydraulic cylinder for operating the disc of the driven pulley, and a belt engaged with both the pulleys, the control system comprising a hydraulic circuit having a pump for supplying oil to both the hydraulic cylinders, a transmission ratio control valve having a spool slidably mounted in a valve body for controlling the oil supplied to the cylinder of the drive pulley and the oil drained from the cylinder to change the transmission ratio, and control means for controlling the position of the spool to control the transmission ratio.

The control system comprises wheel lock detector means for detecting the locking of wheels of the vehicle at braking of the vehicle and for producing a wheel lock signal, release detector means for detecting releasing the locked wheels and for producing a release signal, holding means responsive to the wheel lock signal for operating the control means so as to hold the transmission ratio at that time, the holding means responsive to the release signal for operating the control means so as to release the hold of the transmission ratio.

The other objects and features of this invention will become understood from the following description with reference to the accompanying drawings.

BRIEF DESCRIPTION OF DRAWINGS

FIGS. 5a to 5d graphs showing an operation of a brake switch, characteristics of vehicle speed and wheel speed, transmission ratio and primary pressure, respectively, at wheel lock and at release thereof.

DETAILED DESCRIPTION OF THE PREFERRED EMBODIMENT

Figure 1:
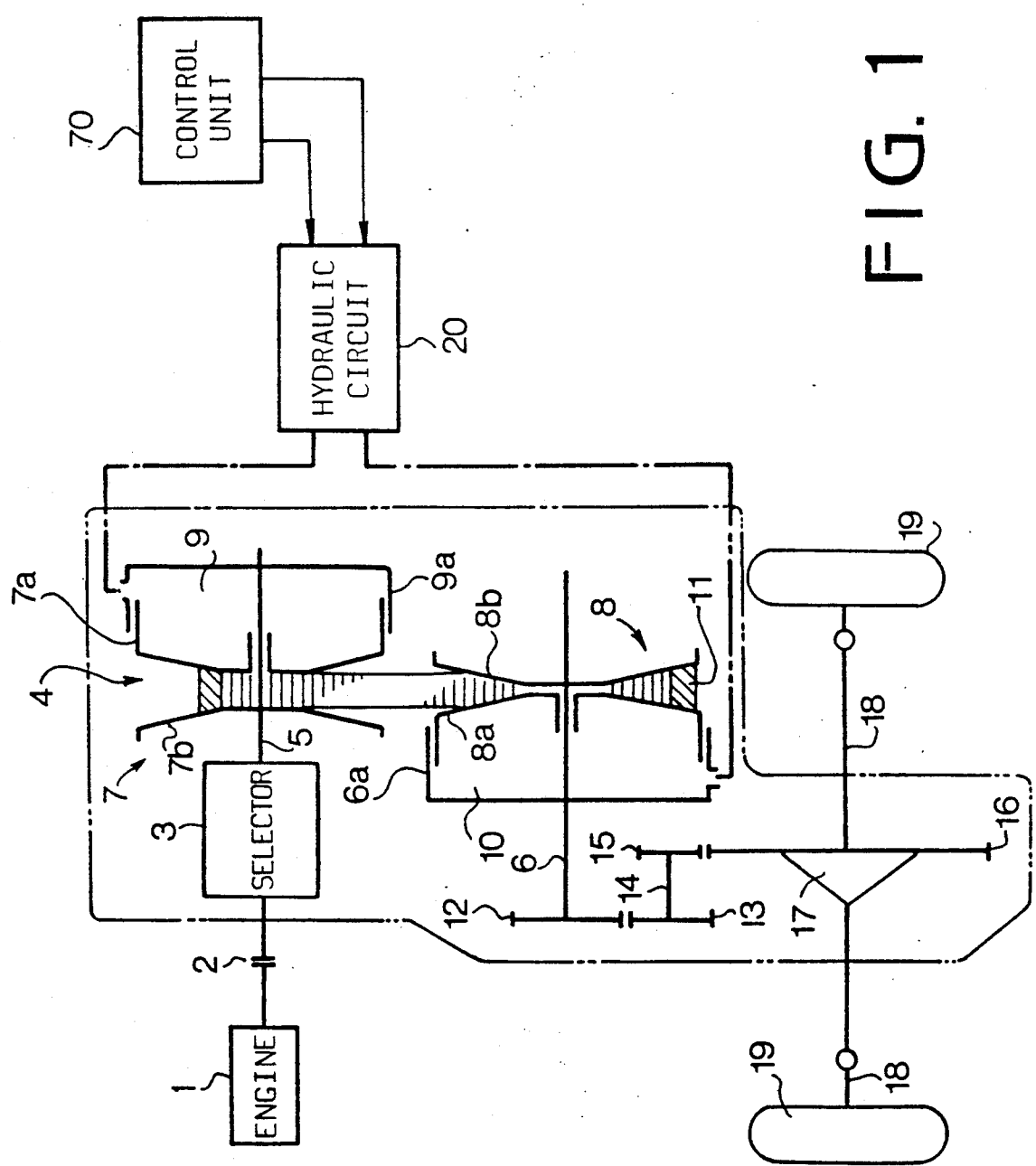
FIG. 1 is a schematic illustration of a continuously variable belt-drive transmission.

Referring to FIG. 1, a continuously variable belt-drive automatic transmission 4 for a motor vehicle to which the present invention is applied, comprises an electromagnetic powder clutch 2 for transmitting the power of an engine 1 to the transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with the hydraulic circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of vehicle driving wheels 19 through a differential 17.

Figure 2A:
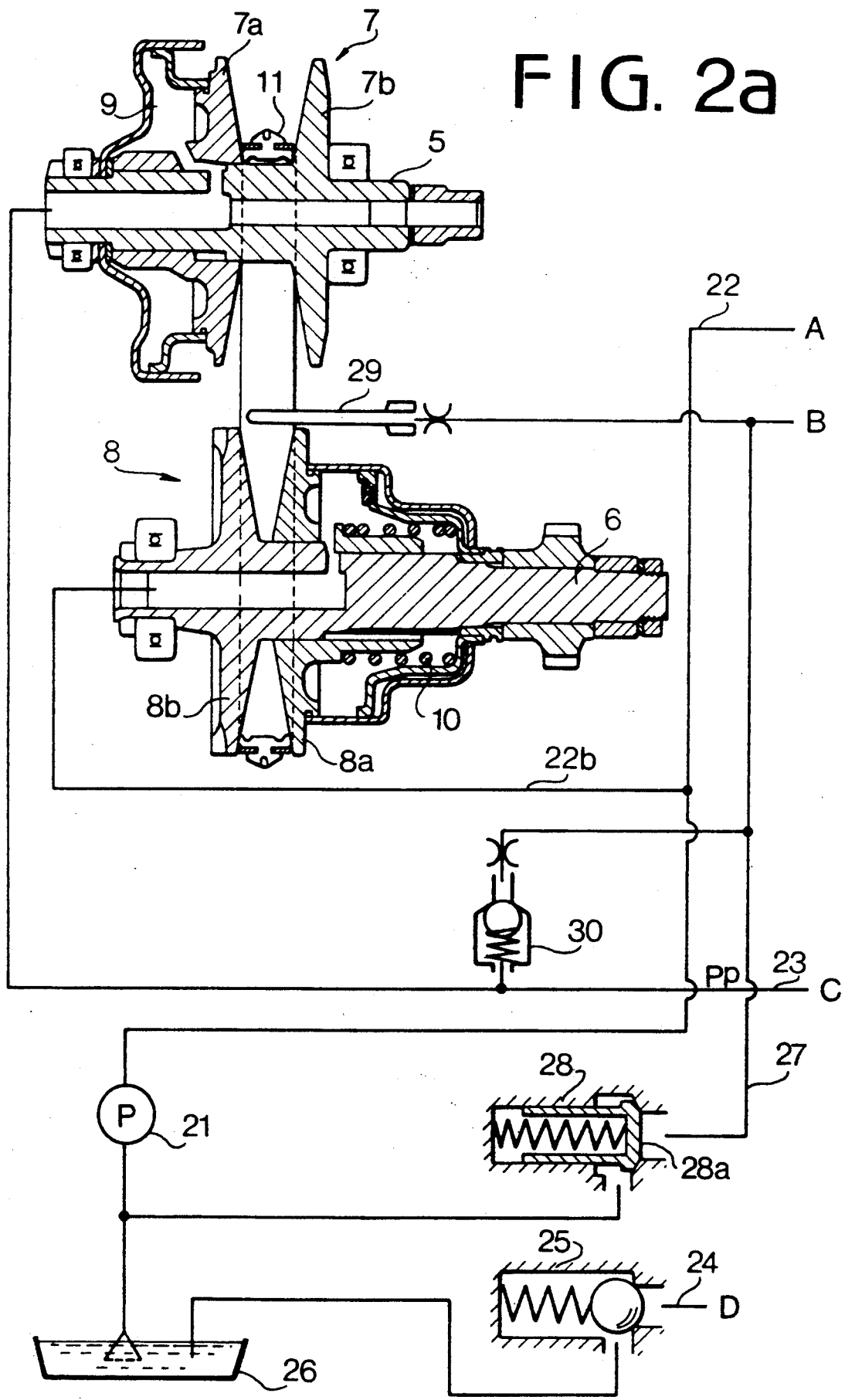
FIGS. 2a to 2c are schematic diagrams showing a control system according to the present invention.
Figure 2B:
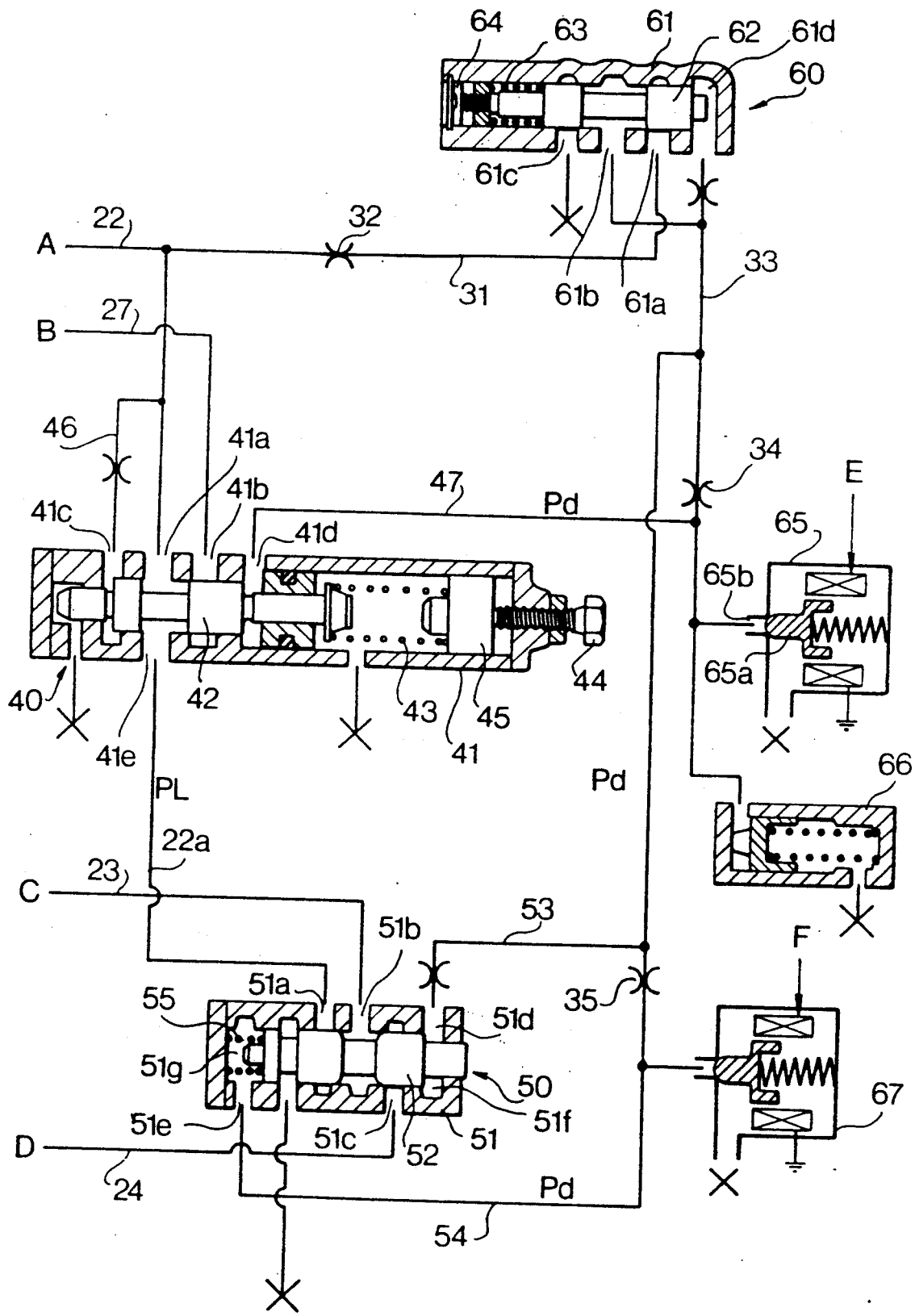
Figure 2C:
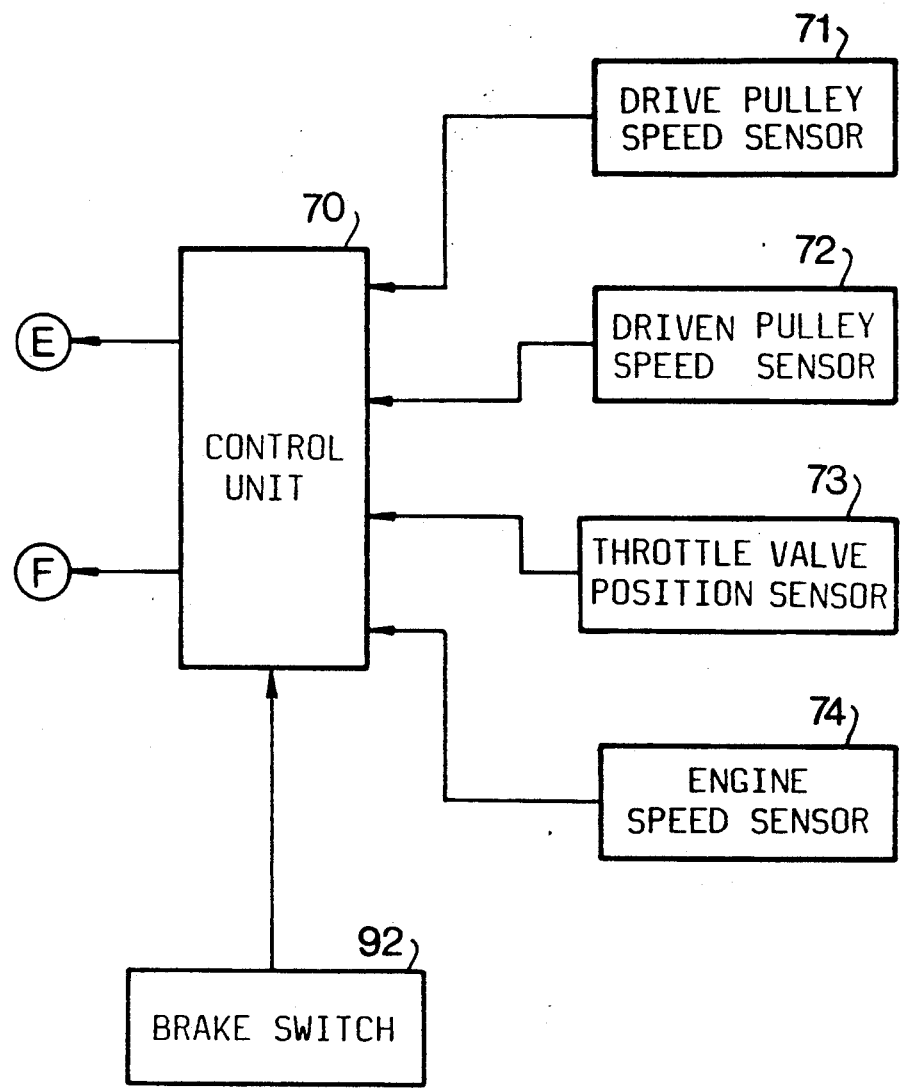

Referring to FIGS. 2a to 2c, the hydraulic circuit 20 includes a line pressure control valve 40 and a transmission ratio control valve 50. A pump 21 is provided to pump up oil from an oil reservoir 26 and to supply the pressurized oil to the line pressure control valve 40. The chamber 10 of the driven pulley 8 is applied with regulated oil by the line pressure control valve 40 passing through a line pressure conduit 22. The chamber 9 of drive pulley 7 is applied with controlled oil by the transmission ratio control valve 50 through a conduit 23. The movable conical disc 7a of the drive pulley 7 is so designed that the pressure receiving area thereof is larger than that of the movable conical disc 8a of the driven pulley 8.

The line pressure control valve 40 has an axially slidable spring retainer 45, a spring 43 provided between the spool 42 and the retainer 45, and an adjust screw 44 screwed in the spring retainer 45 for adjusting the position of the retainer 45. The spool 42 is applied with pressurized oil supplied to a chamber communicating with port 41c through a conduit 46. The spool 42 is urged to the left by the force of the spring 43. The port 41a is selectively communicated with port 41b of a drain passage 27 in accordance with the position of a land of the spool 42, so that the line pressure in the conduit 22 and ports 41a and 41e is controlled.

The transmission ratio control valve 50 comprises a valve body 51, a spool 52, and a spring 55 for urging the spool in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with line pressure control valve 40 through conduit 22a. The drain port 51c is communicated with the oil reservoir 26 through a conduit 24 and check valve 25. The drain port 41b of the line pressure control valve 40 communicates with the oil reservoir 26 through passage 27 and a lubricating oil pressure providing valve 28 in the form of a check valve. The passage 27 is further communicated with the conduit 23 through a check valve 30. A part of the oil in the passage 27 is supplied to the pulley 8 from a nozzle 29 to lubricate the pulley device.

The system of the present invention is provided with a pressure reducing valve or pressure control valve 60 and solenoid operated on-off control valves 65 and 67.

The pressure reducing valve 60 comprises a valve body 61, spool 62, ports 61a, 61b and 61c, end chamber 61d, and spring 63 urging the spool 62 to the chamber 61d. The load of the spring 63 can be adjusted by a screw 64. The port 61a is connected to the conduit 22 by a conduit 31 having an orifice 32, and port 61b and chamber 61d are connected to a conduit 33. When the pressure in the conduit 33 reduces, the spool 62 is shifted to the right by spring 63, so that port 61a communicates with port 61b to increase the pressure in the conduit 33. Thus, a constant pressure of oil is provided in the conduit 33.

The conduit 33 is communicated with the port 41d of line pressure control valve 40 through an orifice 34 and a passage 47. The conduit 33 is also communicated with the reservoir 26 through the solenoid operated on-off valve 65 and with an accumulator 66. Further, the conduit 33 is communicated with an end chamber 51f of the port 51d of the transmission ratio control valve 50 through a passage 53 and with another end chamber 51g of the port 51e through a passage 54 having an orifice 35. The solenoid operated on-off valve 67 is connected to the passage 54 at the downstream position of orifice 35 so as to drain the oil to the reservoir 26. The solenoid operated valve 65 is adapted to be operated by pulses. When energized, a valve 65a opens a drain port 65b. The solenoid operated valve 67 is the same as the valve 65 in construction and operation. The control valves 65 and 67 are operated by pulses from a control unit 70. Thus, control pressures applied to ports 41d, 51e are changed by changing duty ratios of pulses supplied to the control valves 65 and 67.

In the line pressure control valve 40, the relationship among spring load $F_S$ and line pressure PL, line pressure receiving area SL of the spool, control pressure $P_d$ at the port 41d, and control pressure receiving area $S_d$ is as follows:

$$F_s + P_d \cdot S_d = PL \cdot SL$$

$$PL = (P_d \cdot S_d + F_s)/SL$$

Accordingly, the line pressure PL is proportional to the control pressure $P_d$.

The relationship between the duty ratio (D) of the pulses applied to the solenoid operated control valve 67 and the transmission ratio (i) is explained hereinafter.

The transmission ratio changing speed (rate) (di/dt) is a function of flow rate Q of oil supplied to the chamber 9, and the flow rate Q is a function of the duty ratio D, line pressure PL and primary pressure Pp in the chamber 9, namely:

$$di/dt = f(Q) = f(D, PL, P_p)$$

The line pressure PL is decided by the transmission ratio i and engine torque T, and the primary pressure $P_p$ in the chamber 9 is decided by the transmission ratio i and the line pressure PL. Accordingly, assuming the engine torque T to be constant, $$di/dt = f(D, i)$$

$$D = f(di/dt, i)$$

Accordingly, the duty ratio D is decided by the transmission ratio changing speed di/dt and the transmission ratio i. On the other hand, the transmission ratio changing speed di/dt is dependent on the difference between the actual transmission ratio i and a desired transmission ratio id, $$di/dt = K(id - i)$$

where K is a coefficient.

Accordingly, if the transmission ratio changing speed di/dt is decided, the duty ratio D can be obtained from the transmission ratio i. When the actual transmission ratio i is larger than the desired transmission ratio id (i > id), the value of di/dt is negative. In such a state, the duty ratio D is increased to reduce the pressure in the chamber 51g so as to upshift the transmission. The downshift is performed in the reverse manner.

Figure 3:
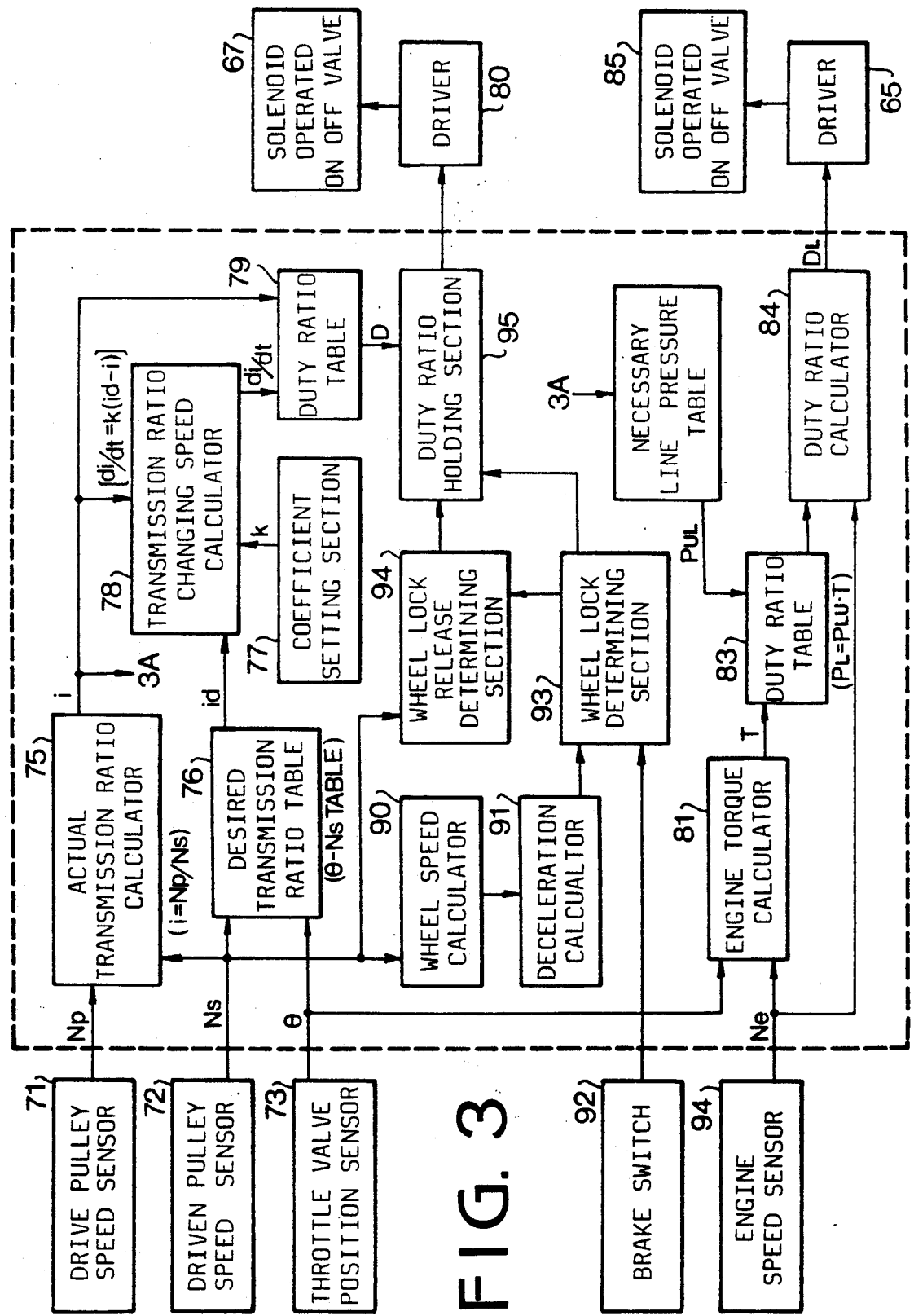
FIG. 3 is a block diagram showing a control unit.

Referring to FIG. 3, the system is arranged to control the transmission ratio in accordance with the above described principle. In the system, a drive pulley speed sensor 71, driven pulley speed sensor 72, throttle position sensor 73, engine speed sensor 74 and a brake switch 92 are provided. Output signals $N_P$ and $N_S$ of the sensors 71, 72 are fed to an actual transmission ratio calculator 75 to produce an actual transmission ratio i in accordance with $i = N_P/N_S$. Output signal $N_S$ and output signal $\theta$ representing the opening degree of the throttle position sensor 73 are fed to a desired transmission ratio table 76. The desired transmission ratio id is derived from the table 76 in accordance with signals $N_S$ and $\theta$.

A coefficient setting section 77 produces a coefficient K. The actual transmission ratio i, desired transmission ratio id and coefficient K are is applied to a transmission ratio changing speed calculator 78 to produce a transmission ratio changing speed (rate) di/dt from the formula $di/dt = K(id - i)$.

The speed (rate) di/dt and actual transmission ratio i are applied to a duty ratio table 79 to derive the duty ratio D. As described above, the duty ratio D is a function of the transmission ratio changing speed di/dt and the actual transmission ratio i (D = f(di/dt, i). The duty ratio D is supplied to the solenoid operated on-off valve 67 through a driver 80.

The system is provided with a control system for preventing the belt 11 of the continuously variable transmission 4 from slipping on the pulleys 7 and 8 when the wheels 19 of the vehicle are locked at braking the vehicle.

More particularly, the control unit 70 has a wheel speed calculator 90 where a wheel speed Vw is calculated by multiplying the driven pulley speed represented by the signal $N_S$ by a gear ratio of the gear train provided between the output shaft 6 and the wheels 19. The wheel speed Vw is applied to a deceleration calculator 91 where a deceleration $-dVw/dt$ is calculated. The deceleration $-dVw/dt$ and the output signal of the brake switch 92 which is produced when the brake pedal is depressed are fed to a wheel lock determining section 93. The determining section 93 determines that the wheels 19 are locked when the deceleration $-dVw/dt$ is larger than a predetermined reference value G ($-dVw/dt \geq G$) and then produces a wheel lock signal. The wheel lock signal is fed to a duty ratio holding section 95 where the duty ratio D derived from the table 79 is fed. When the wheel lock signal is applied, the holding section 95 applies the present duty ratio D before the wheel-lock to the driver 80.

The wheel lock signal from the wheel lock determining section 93 is further applied to a wheel lock release determining section 94 where the release of the wheel-lock is determined in dependency on the output signal $N_S$ of the driven pulley speed sensor 72. Namely, when the wheels start to rotate as a result of the release of the brake pedal, and the driven pulley speed sensor 72 resumes generating the $N_S$ signal, it is determined that the locking of the wheels is released. The determining section 94 applies a release signal to the duty ratio holding section 95 so as to release the holding of the duty ratio D.

Further, the output signal $\theta$ of throttle position sensor 73 and the output $N_e$ of engine speed sensor 74 are fed to an engine torque calculator 81, so that engine torque T is calculated based on throttle position $\theta$ and engine speed $N_e$.

On the other hand, the actual transmission ratio i from the calculator 75 is applied to a necessary line pressure table 82 to derive a necessary line pressure $P_{LU}$ per unit torque. The necessary line pressure $P_{LU}$ and the engine torque T are applied to a desired line pressure calculator 83 where a desired line pressure $P_L$ is calculated in accordance with $P_L = P_{LU} \cdot T$.

The desired line pressure $P_L$ is applied to a duty ratio calculator 84 to calculate a duty ratio $D_L$ corresponding to the desired line pressure $P_L$ in dependency on $D = (Pmax - P_L)/(Pmax - Pmin)$ where Pmax is a maximum line pressure and Pmin is a minimum line pressure at the engine speed Ne. The duty ratio $D_L$ is supplied to a driver 85 which operates the solenoid operated on-off valve 65 at the duty ratio.

In operation, while the vehicle is at a stop, chamber 10 of the driven pulley 8 is supplied with line pressure through passage 22b, and the chamber 9 of the drive pulley 7 is drained, since the $N_p$, $N_S$, and $\theta$ are zero and the duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage).

When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started. When the vehicle speed (output signal $N_S$) exceeds a predetermined value, the clutch 2 is entirely engaged.

At starting of the vehicle, the line pressure is at the highest value by the pressure control valve 40, since the duty ratio for the valve 65 is small, and the spool 42 of the control valve 40 is at the left end position.

When the throttle valve is opened for acceleration of the vehicle, the transmission ratio changing speed di/dt is calculated at the calculator 78. The transmission ratio changing speed di/dt is fed to the duty ratio table 79, so that the duty ratio D for valve 67 is obtained from the table 79.

When the depression of the accelerator pedal stops, the transmission ratio changing speed di/dt becomes negative. Accordingly the value of the duty ratio D becomes larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23 to upshift the transmission. When the actual transmission ratio i reaches the desired transmission ratio id, the changing speed di/dt becomes zero, so that the upshifting operation stops.

As the difference between the desired ratio id and actual ratio i becomes large and the desired transmission ratio changing speed di/dt becomes large, the duty ratio D for the valve 67 becomes large, thereby increasing the shifting speed of the spool 52 to increase the actual transmission changing speed.

When the opening degree of the throttle valve is reduced for deceleration, the duty ratio is reduced along a low engine speed line, thereby shifting the spool 52 to the right to drain the chamber 9. Thus, the transmission is downshifted. The transmission changing speed at downshifting increases with reducing of the duty ratio.

The control operation of line pressure will be described hereinafter. From the engine torque calculator 81, a torque T is obtained in accordance with throttle position $\theta$ and engine speed $N_e$, which is applied to desired line pressure calculator 83. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 4:
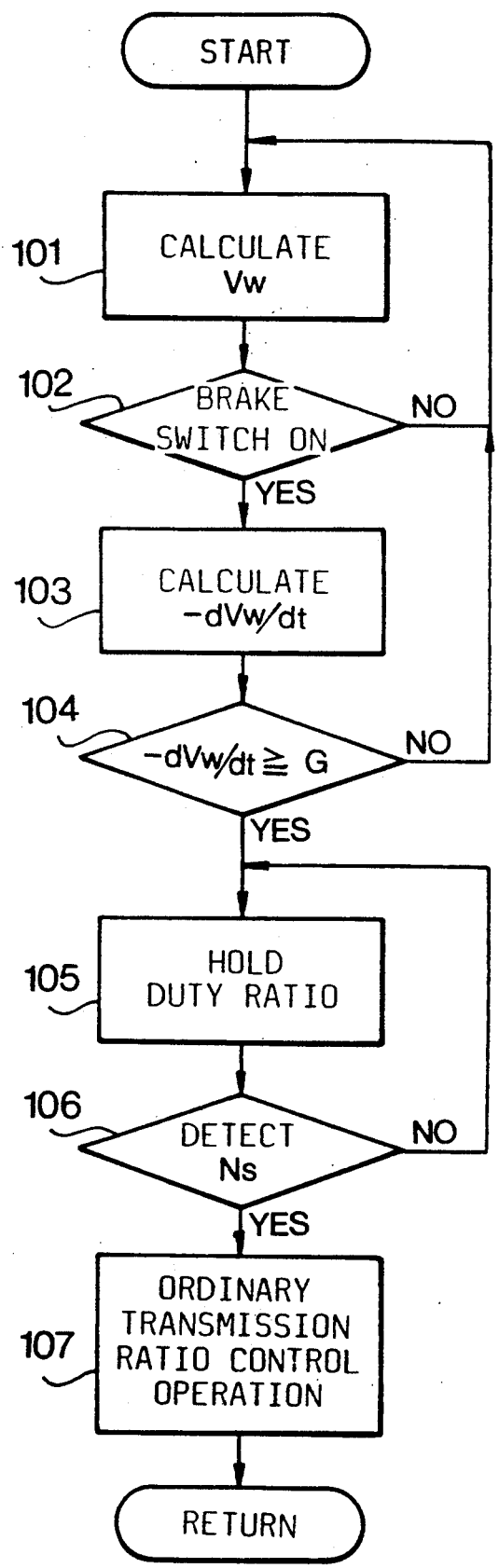
FIG. 4 is a flowchart showing the operation of the system.

The operation shown by the flowchart in FIG. 4 is repeated while the vehicle is driven. At a step 101, a wheel speed Vw is calculated based on the driven pulley speed signal $N_S$. When it is determined at a step 102 that the brake pedal is depressed, the deceleration $-dVw/dt$ is calculated at a step 103. At a step 104, it is determined whether the calculated deceleration $-dVw/dt$ is larger than the reference value G. When the deceleration is larger than the reference value G, it is determined that the wheels are locked. Accordingly, the program goes to a step 105 to maintain the duty ratio at the present value. As a result, as shown by a dot-dash line in FIG. 5a, the primary pressure in the chamber 9 is kept high. Thus, the pulleys 7 and 8 hold the belt 11 at the large transmission ratio position.

When the brake pedal is released, the wheel speed Vw increases so that the driven pulley 8 and the belt 11 are rapidly rotated. Thus, the driven pulley speed signal $N_S$ is detected at a step 106. Since the drive pulley 7 is held by a high primary pressure, the pulley 7 is driven by the belt 11 without slipping. Consequently, the transmission ratio i is kept substantially constant as shown by a dot-dash line i-3 in FIG. 5b regardless of the desired transmission ratio id. Thereafter, at a step 107, the transmission ratio is controlled in an ordinary manner. As the driven pulley speed increases the desired transmission ratio decreases to upshift the transmission, so that the actual transmission smoothly approximates the desired transmission ratio id as shown in FIG. 5b.

In the above embodiment, the driven pulley speed is used as the wheel speed, but it is obvious that the output signal of the other sensors, such as the wheel speed sensor, may be used for determining the wheel-lock and the release of the wheel-lock.

In accordance with the present invention, since the primary pressure in the oil chamber of the drive pulley is kept high when the wheels are locked, the slipping of the belt on the pulleys and the change speed shock are prevented when the wheels recover speed.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a continuously variable transmission for transmitting the power of an automotive engine to driving wheels of a vehicle, the transmission comprising a drive pulley having a hydraulically shiftable disc and a hydraulic cylinder for operating the disc, a driven pulley having a hydraulically shiftable disc and a hydraulic cylinder for operating the disc of the driven pulley, and a belt engaged with both the pulleys, the system comprising a hydraulic circuit having a pump for supplying oil to both the hydraulic cylinders, a transmission ratio control valve with a valve body and a spool slidably mounted in the valve body, sensing means for sensing various driving conditions of the vehicle, control means responsive to the driving conditions for calculating a desired transmission ratio to generate a control signal relating to the desired transmission ratio, and actuating means responsive to the control signal for actuating the spool to control oil pressure to be applied to the hydraulic cylinder of the drive pulley to control transmission ratio of the transmission so as to change the transmission ratio of the transmission, the system comprising:
  lock detecting means for detecting locking of the wheels of the vehicle at braking of the vehicle and for producing a lock signal;
  release detecting means for detecting releasing of the locked wheels and for producing a release signal;
  holding means responsive to the lock signal for holding the control signal at that time so as to maintain the oil pressure in the hydraulic cylinder of the drive pulley; and
  said holding means responsive to the release signal for releasing the holding of the control signal to immediately restart the control of the transmission ratio during coasting of the vehicle.

2. The system according to claim 1, wherein
the lock detecting means comprises:
a speed sensor detecting wheel speed;
calculator means for calculating deceleration of the wheel speed;
a brake switch provided to generate a switch signal when a brake of the vehicle is depressed; and
a lock determining section responsive to the switch signal for the detecting of the locking of the wheels when the deceleration becomes larger than a preset value.

3. The system according to claim 2, wherein
the release detecting means comprises:
a release determining section operatively responsive to the brake switch for determining the releasing of the locked wheels when the wheel speed is resumed from a locked condition of the wheels.

4. The system according to claim 1, wherein
the sensing means comprises:
a first sensor for sensing drive pulley speed;
a second sensor for sensing driven pulley speed; and
a third sensor for sensing a throttle valve position.

5. The system according to claim 4, wherein the control means comprises:
first calculating means responsive to the drive and driven pulley speeds for calculating an actual transmission ratio of the transmission;
means responsive to the driven pulley speed and the throttle valve position for calculating the desired transmission ratio;
second calculating means responsive to the actual and desired transmission ratios for calculating a transmission ratio changing speed; and
setting means responsive to the actual transmission ratio and the transmission ratio changing speed for setting a duty ratio of the control signal.

6. The system according to claim 4, wherein
said holding means holds and releases the holding of the control signal respectively independent of engine speed.

7. A method for controlling a control system for controlling transmission ratio of a continuously variable transmission for transmitting the power of an automotive engine to driving wheels of a vehicle, the transmission comprising a drive pulley having a hydraulically shiftable disc and a hydraulic cylinder for operating the disc, a driven pulley having a hydraulically shiftable disc and a hydraulic cylinder for operating the disc of the driven pulley, and a belt engaged with both the pulleys, the control system having a hydraulic circuit having a pump for supplying oil to both the hydraulic cylinders, a transmission ratio control valve with a valve body and a spool slidably mounted in the valve body, sensing means for sensing various driving conditions of the vehicle, control means responsive to the driving conditions for calculating a desired transmission ratio to generate a control signal relating to the desired transmission ratio, and actuating means responsive to the control signal for actuating the spool to control oil pressure to be applied to the hydraulic cylinder of the drive pulley to control the transmission ratio so as to change the transmission ratio of the transmission, the method comprising the steps of:
  detecting locking of wheels of the vehicle at braking of the vehicle to produce a lock signal;
  in response to the lock signal holding the control signed at that time so as to maintain the oil pressure in the hydraulic cylinder of the drive pulley;
  detecting releasing of the locked wheels to produce a release signal; and
  releasing the holding of the control signal in response to the release signal to immediately restart the control of the transmission ratio during coasting of the vehicle.

8. The method according to claim 7, wherein
the steps of holding and releasing the holding of the control signal are independent of engine speed.

* * * * *